Figure 1:
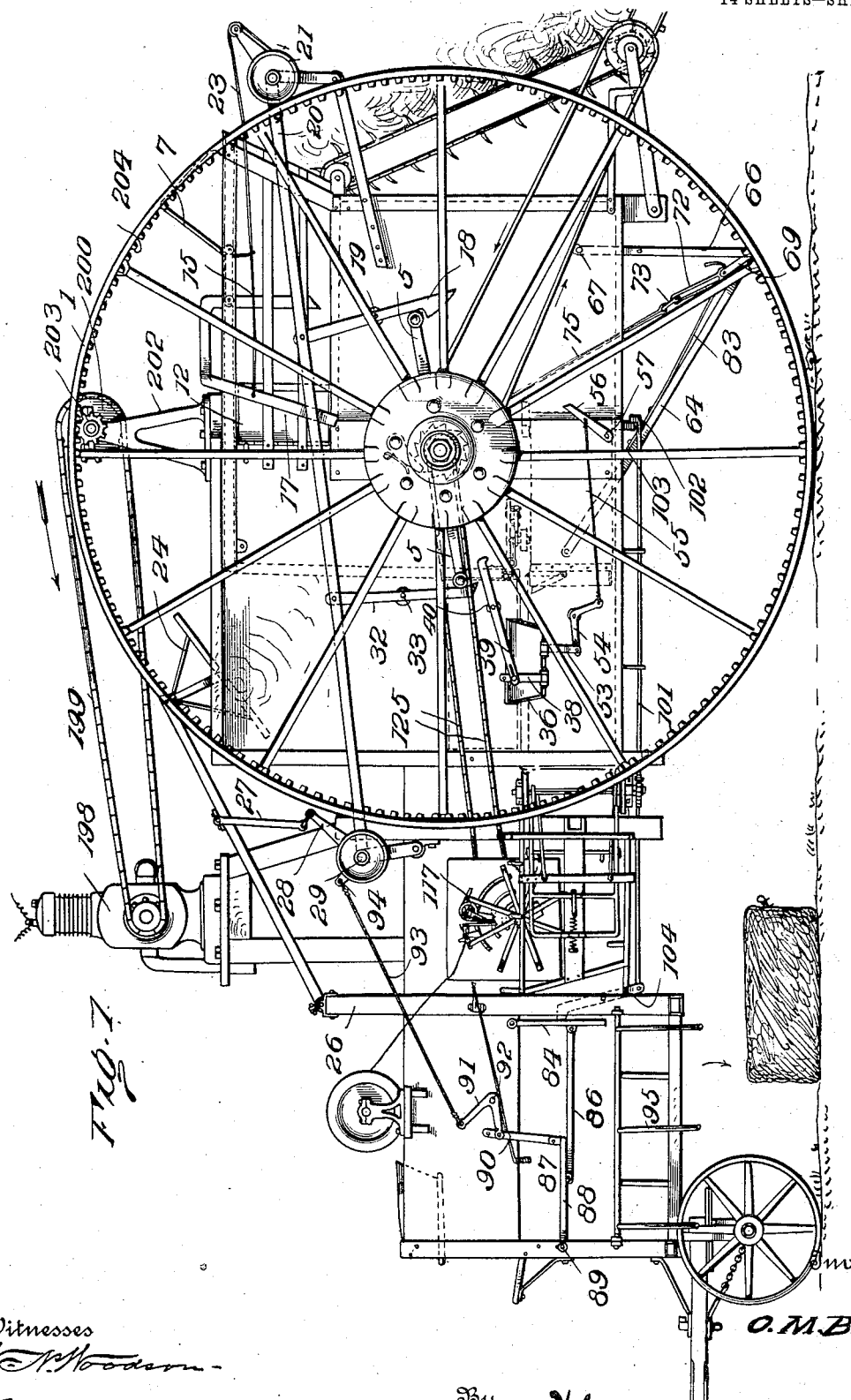

O. M. BRYAN.
BALING MACHINE.
APPLICATION FILED MAR. 21, 1911.

1,017,202.

Patented Feb. 13, 1912.
14 SHEETS—SHEET 1.

Witnesses
Inventor
O. M. Bryan,
By
Attorneys.

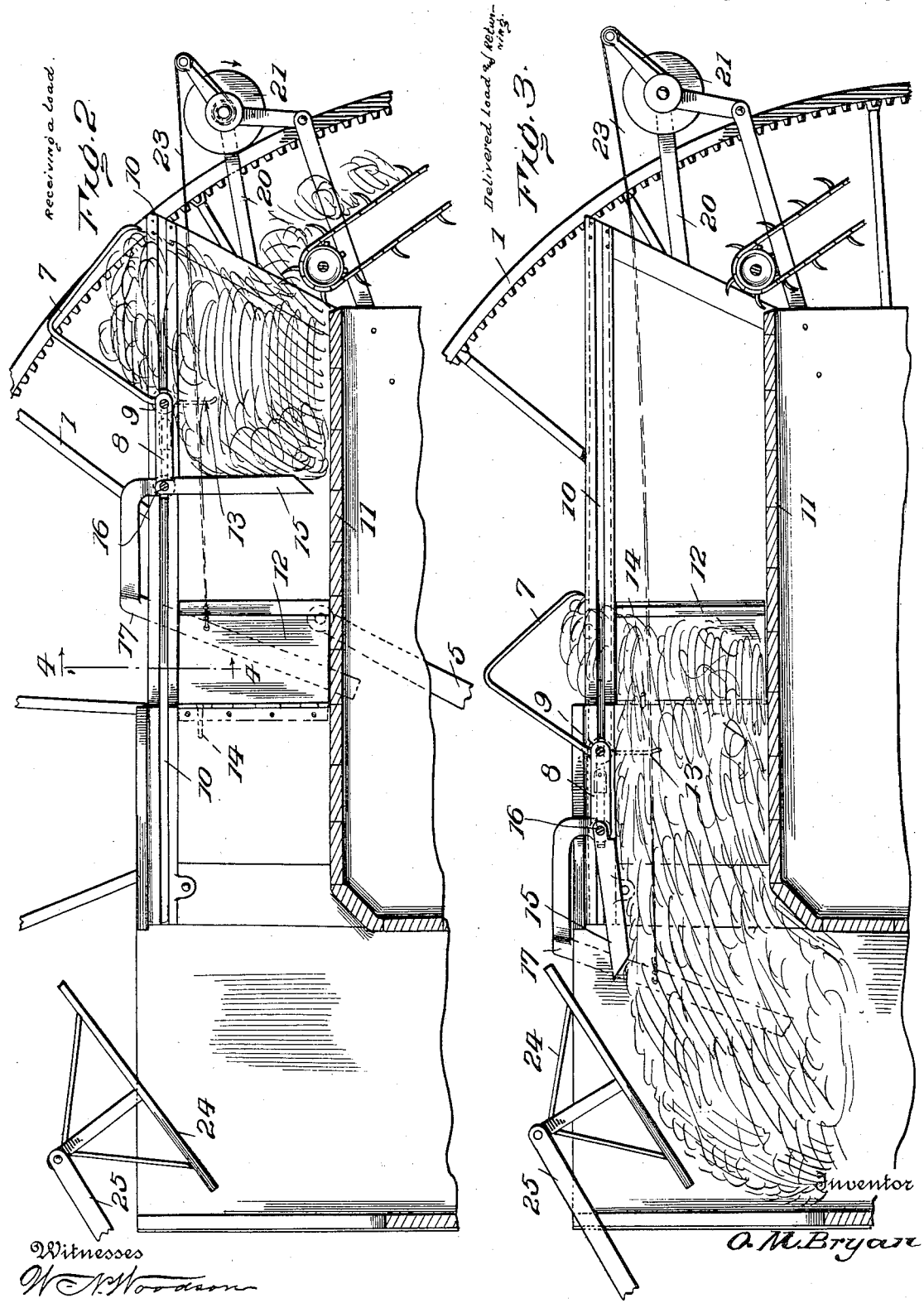

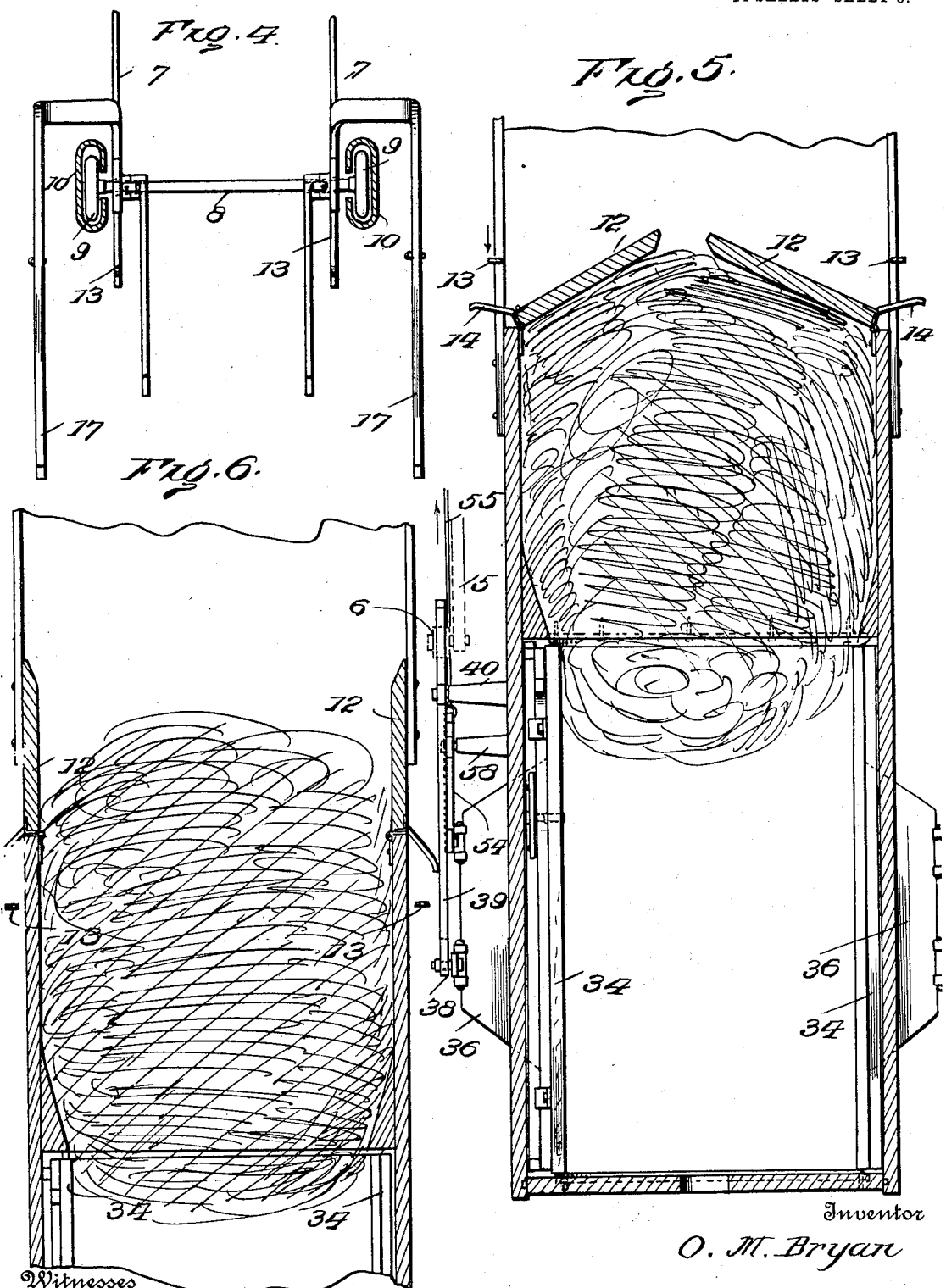

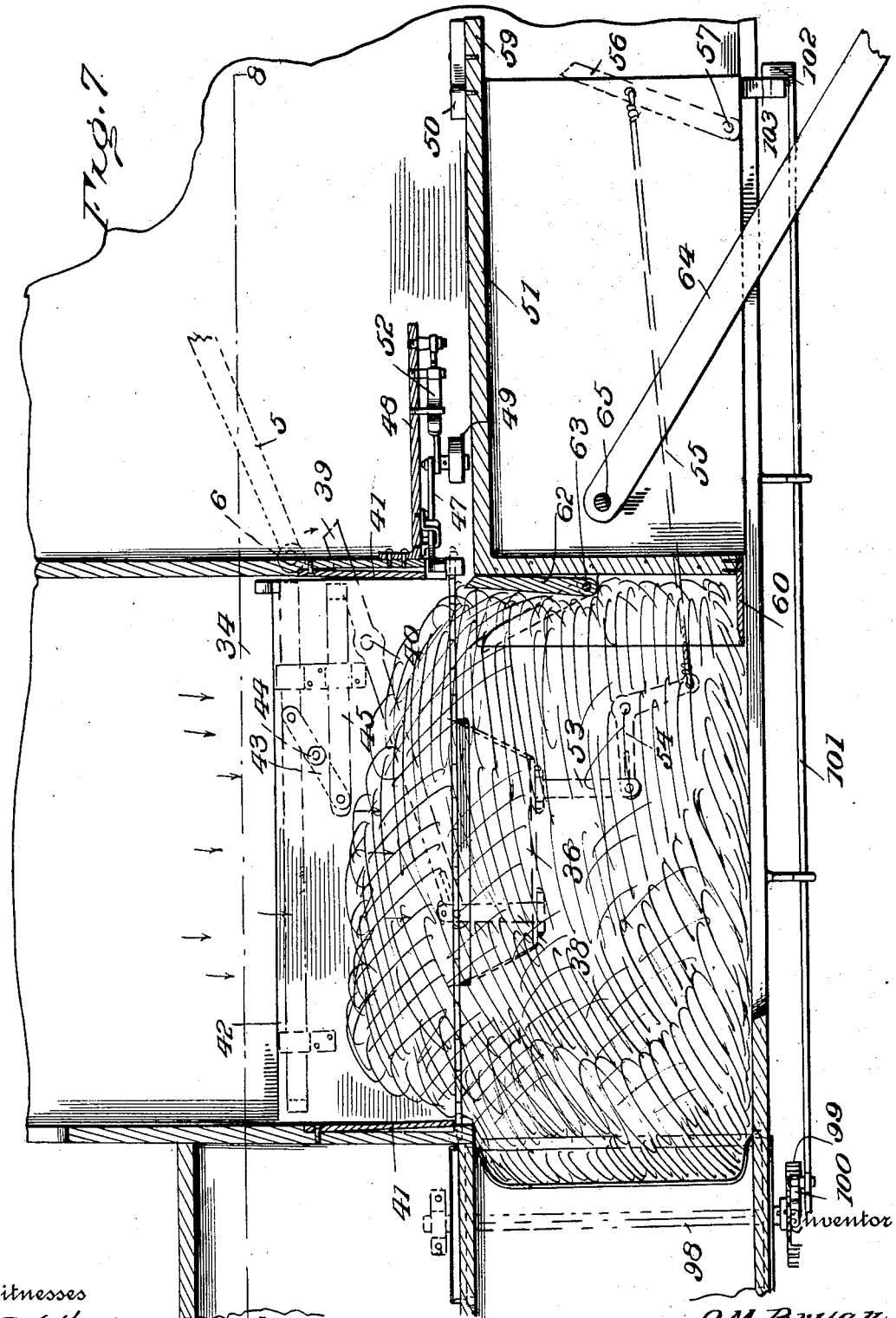

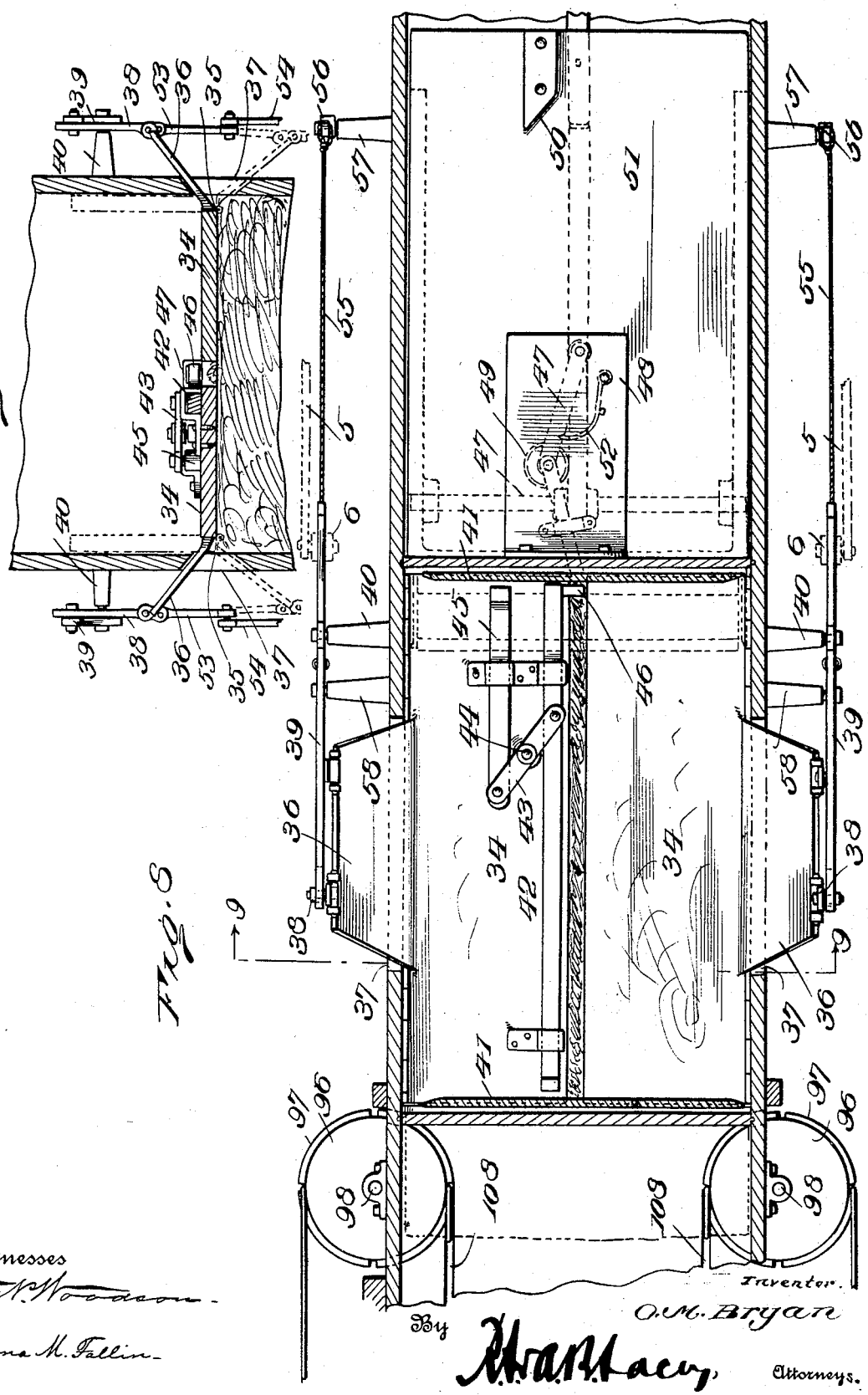

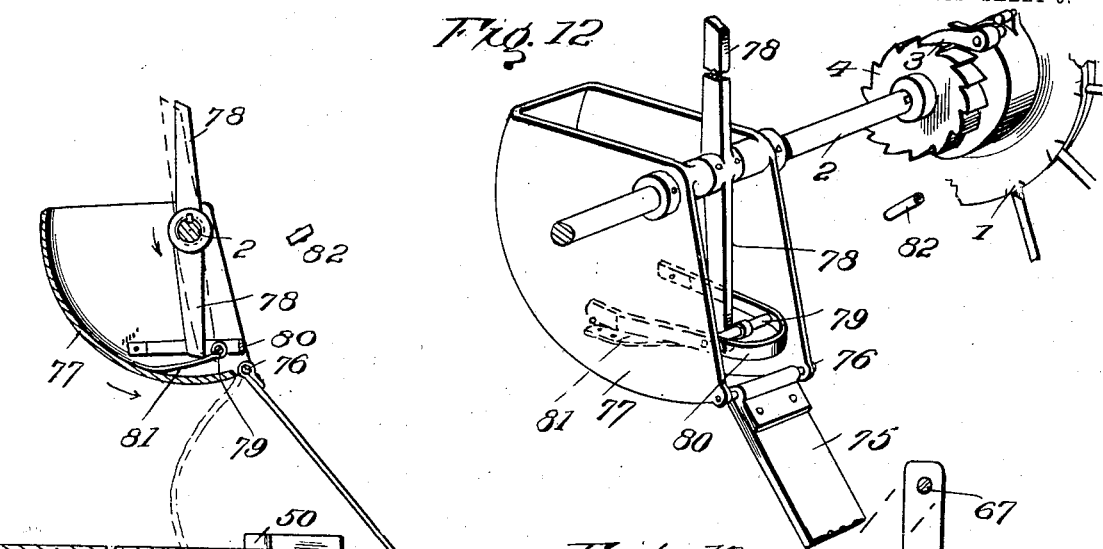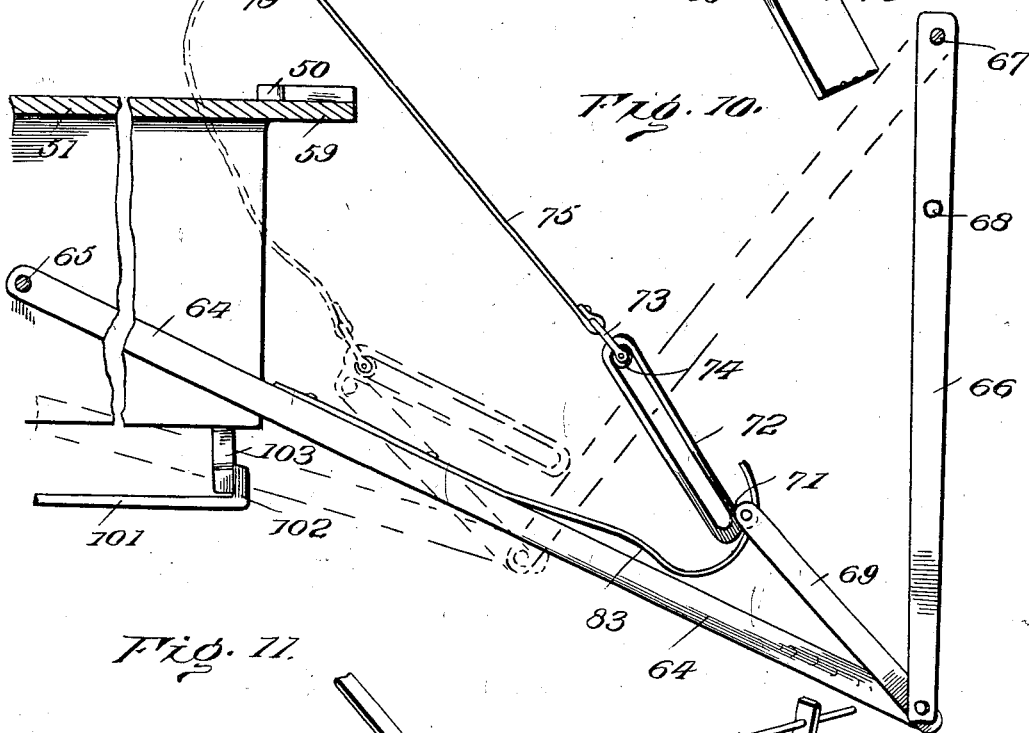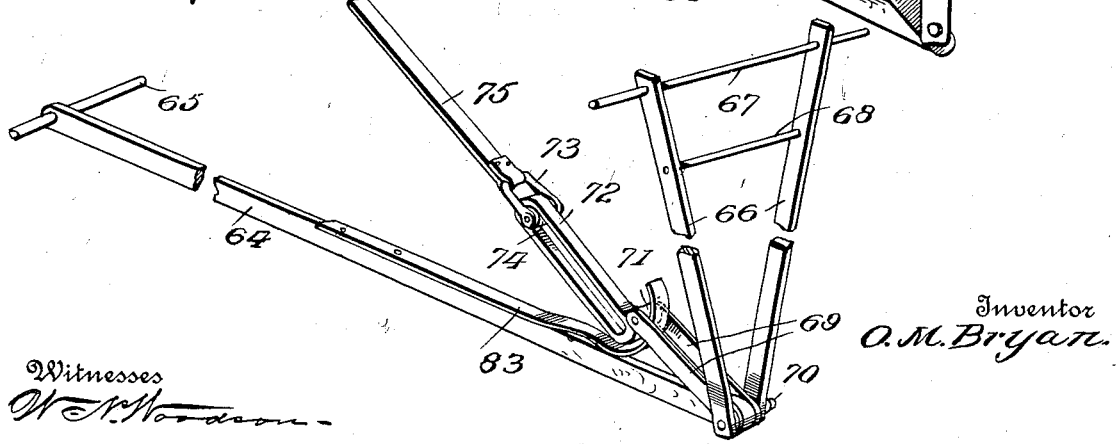

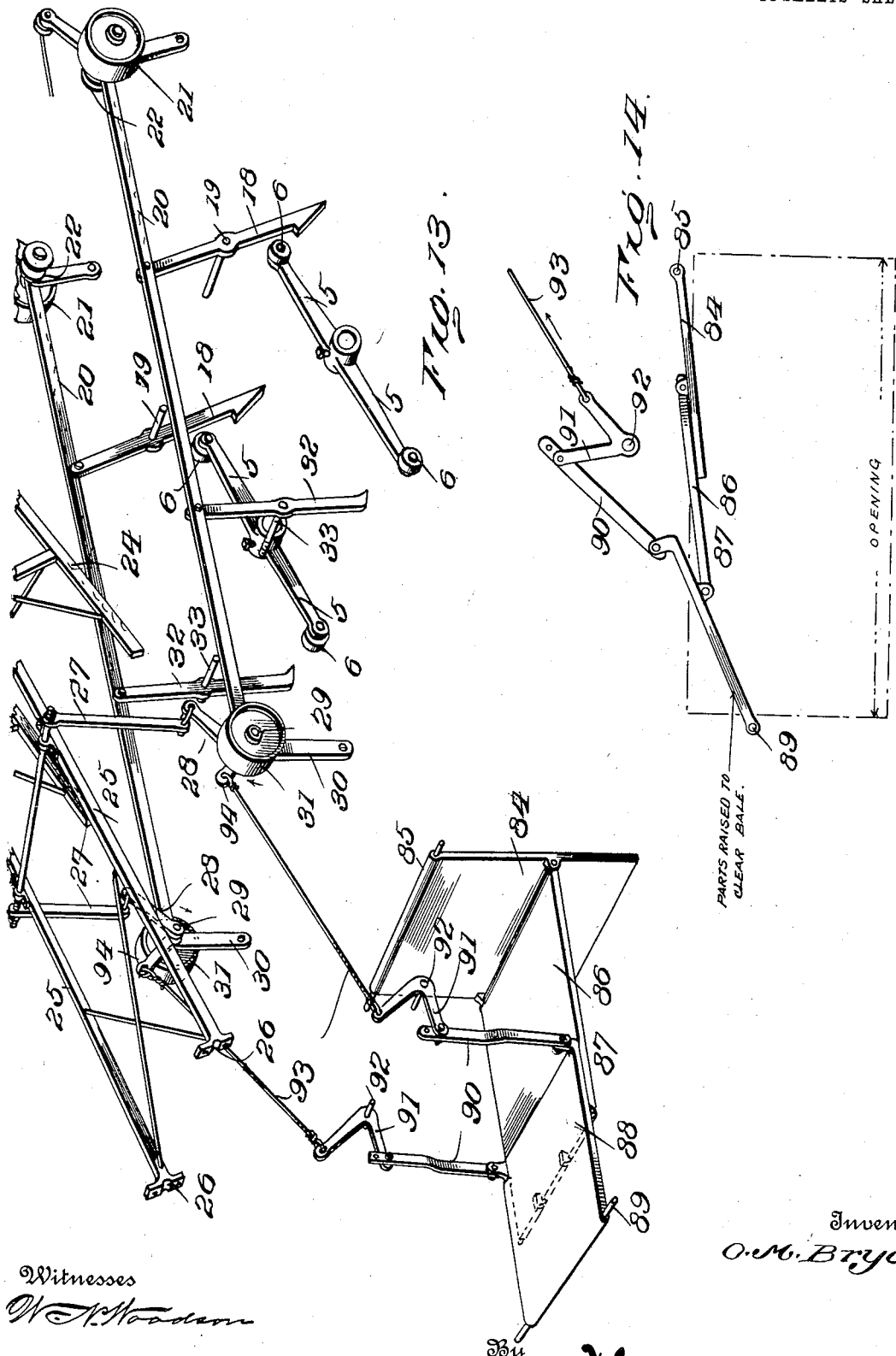

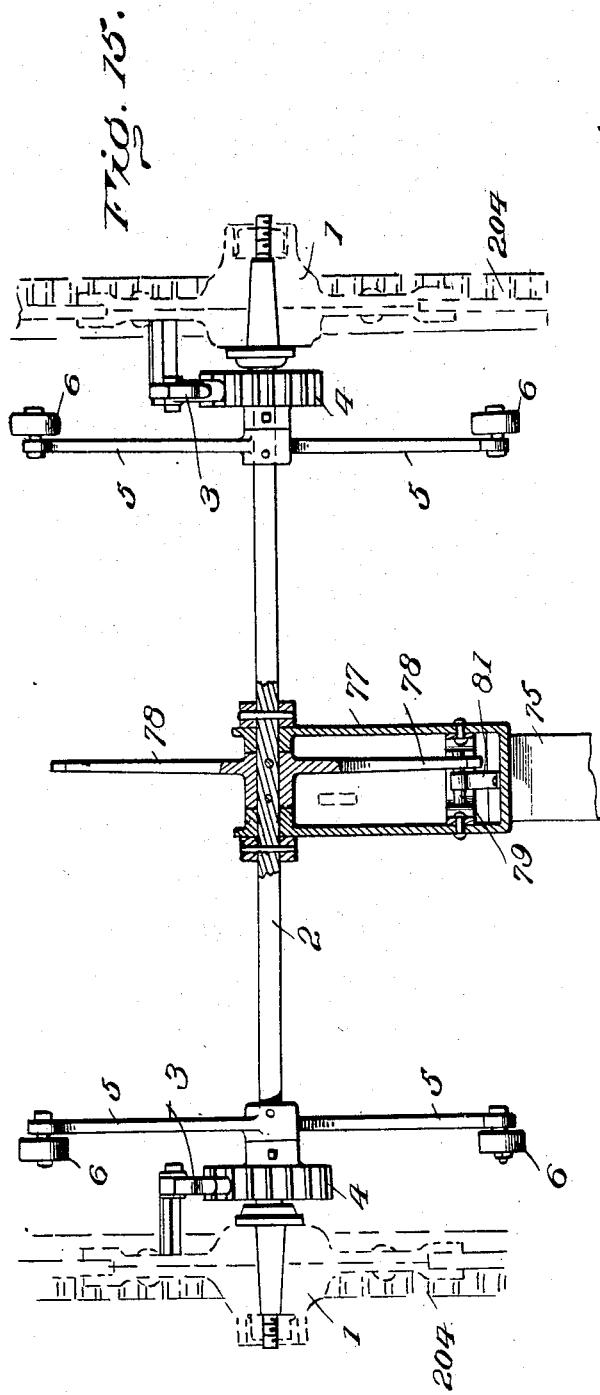

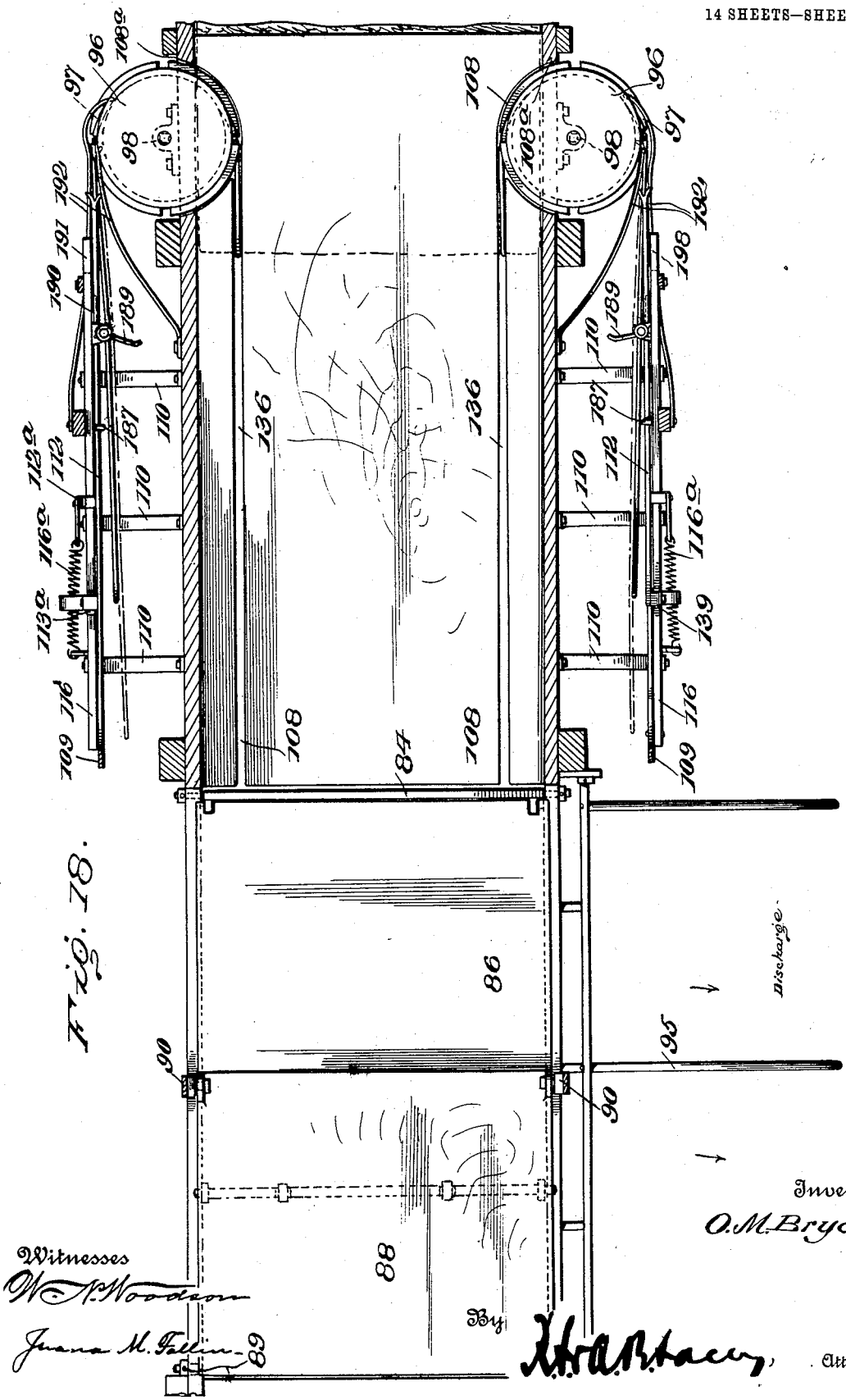

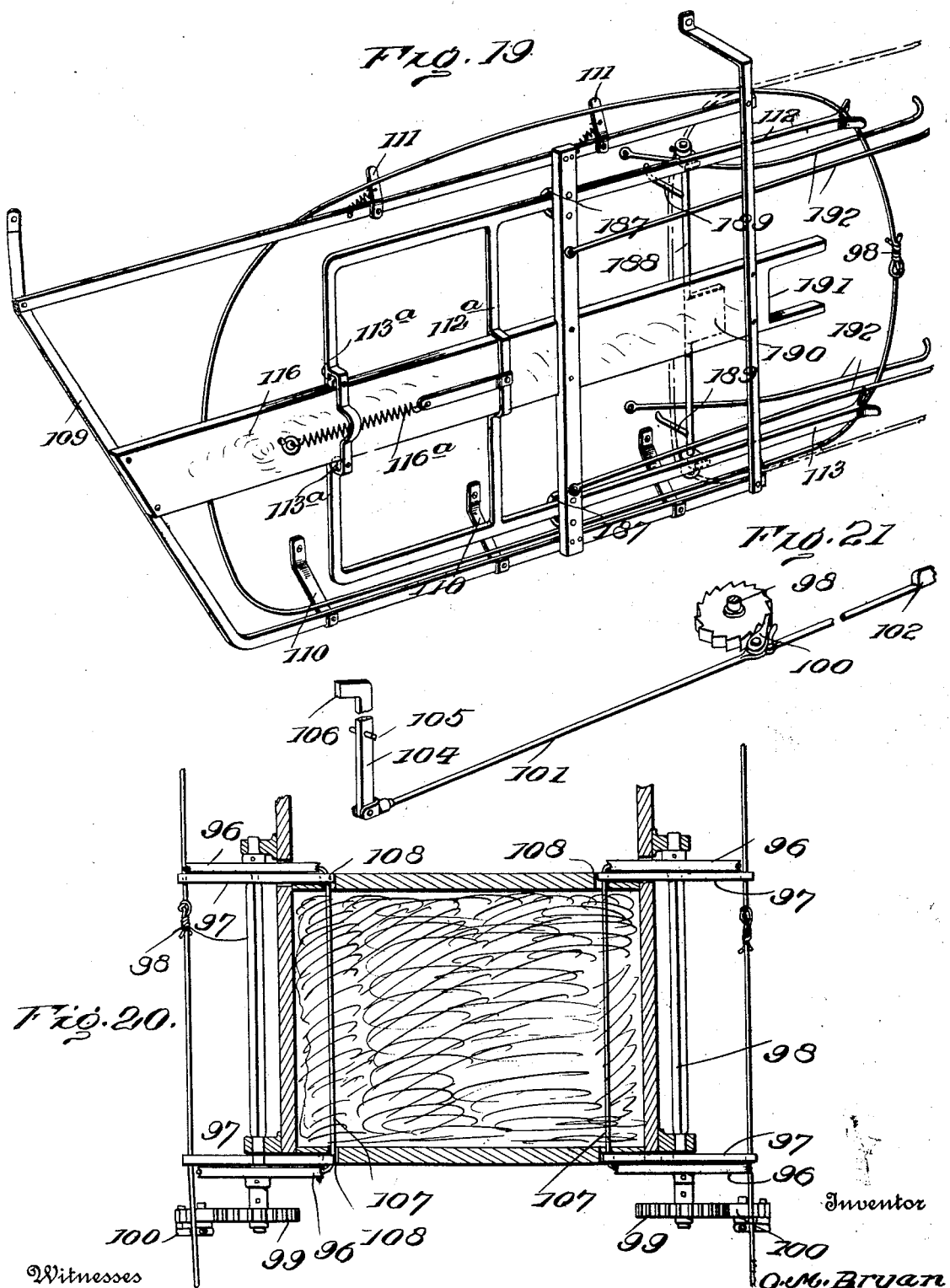

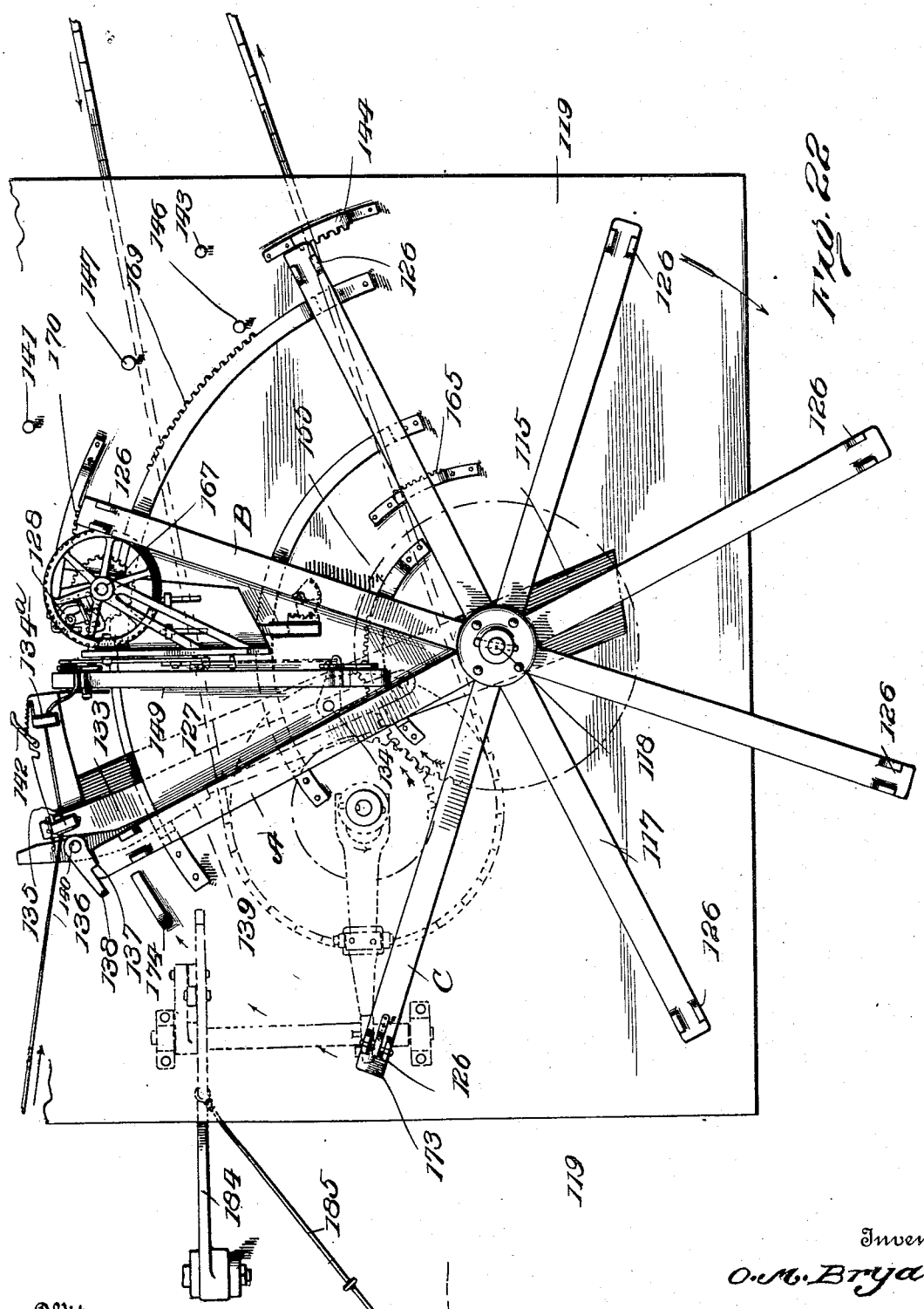

O. M. BRYAN.
BALING MACHINE.
APPLICATION FILED MAR. 21, 1911.
1,017,202.
Patented Feb. 13, 1912.
14 SHEETS—SHEET 12.
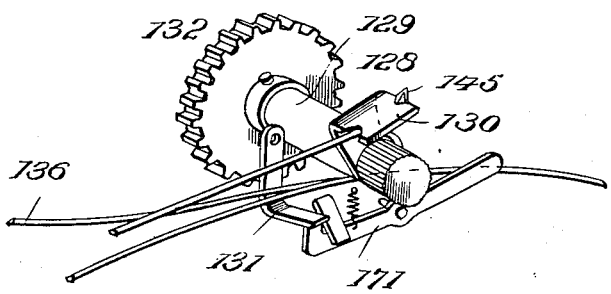
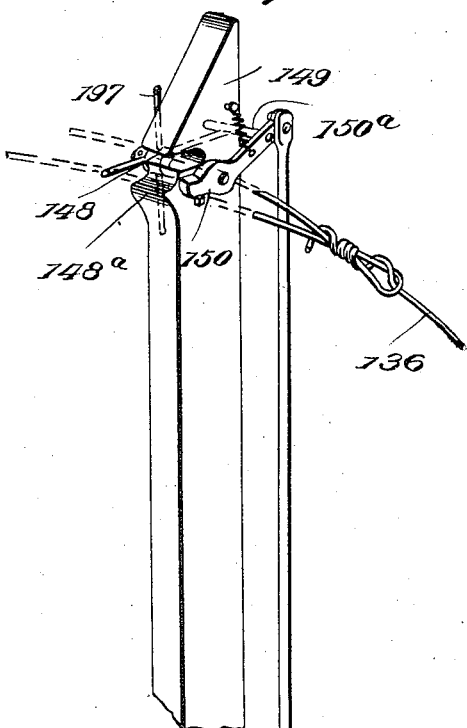
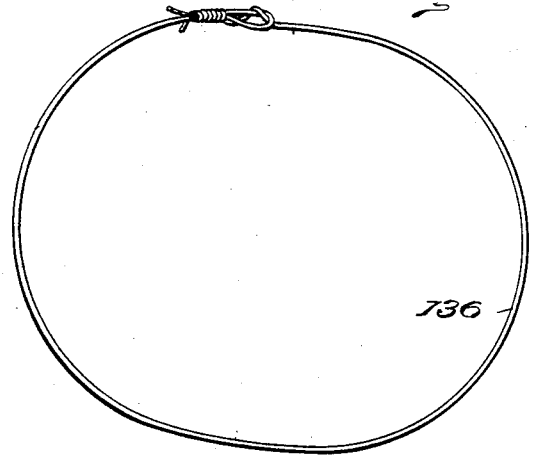
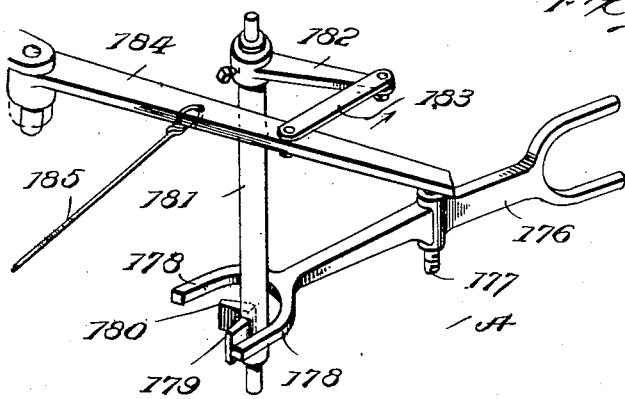
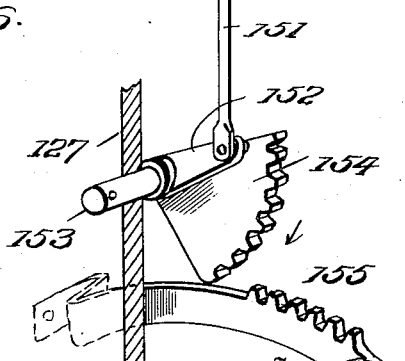
Witnesses
Inventor
O. M. Bryan
By _____, Attorneys.

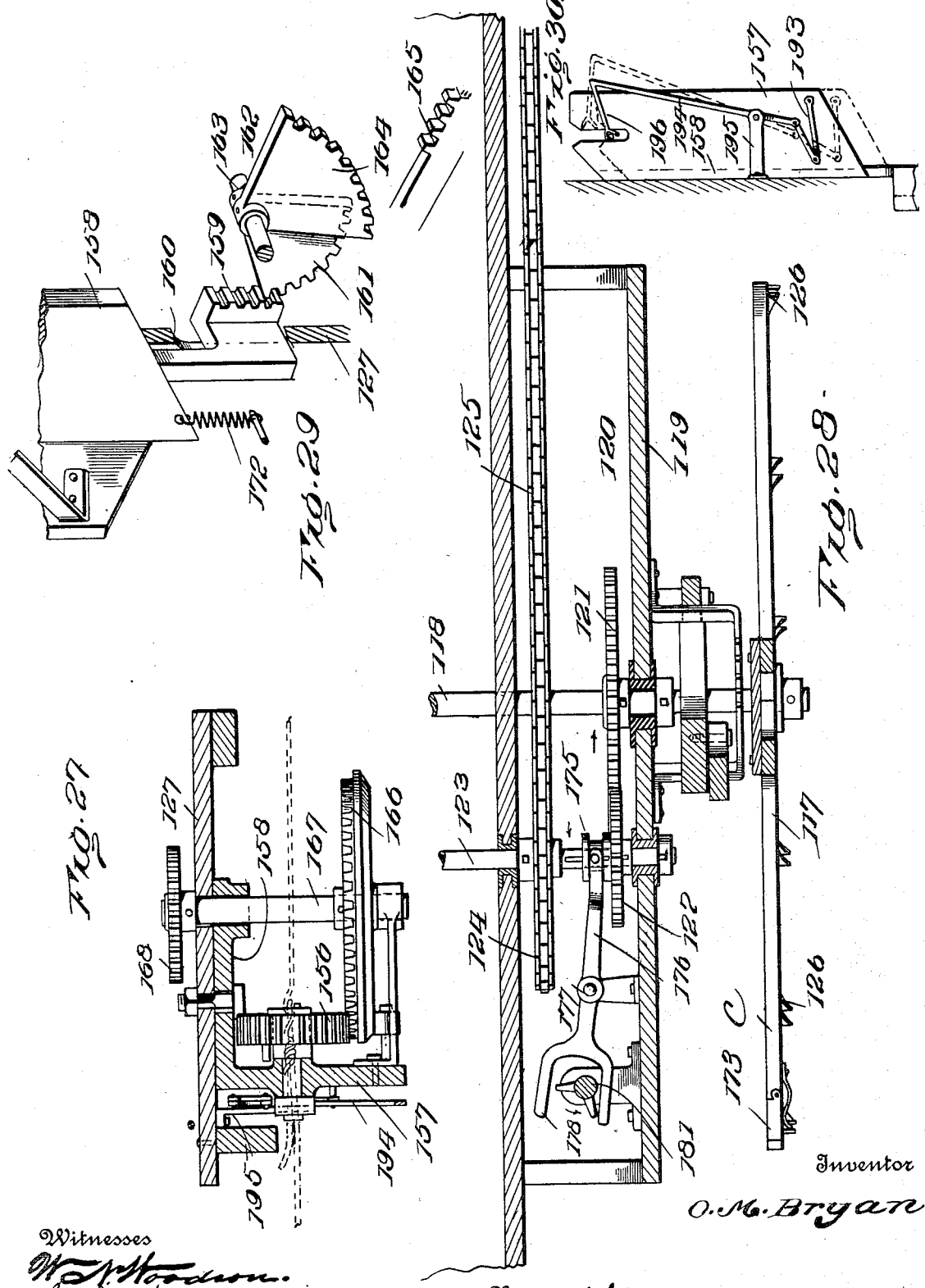

O. M. BRYAN.
BALING MACHINE.
APPLICATION FILED MAR. 21, 1911.
1,017,202.
Patented Feb. 13, 1912.
14 SHEETS—SHEET 14.
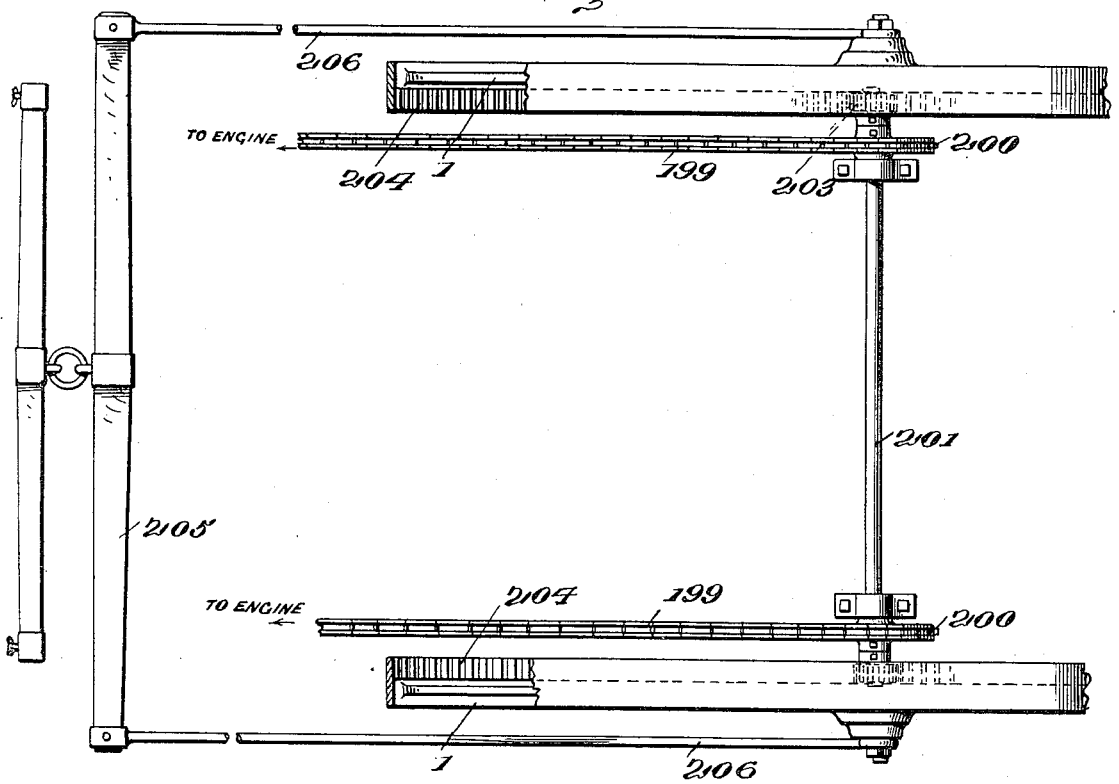
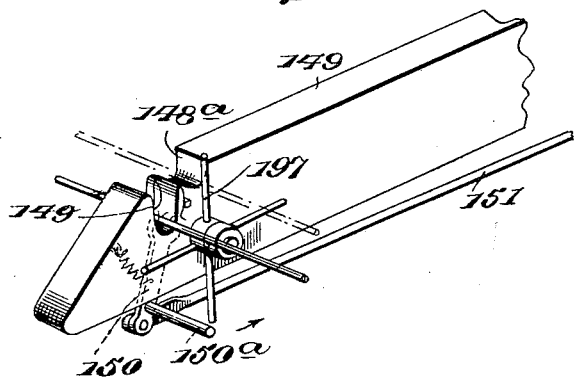
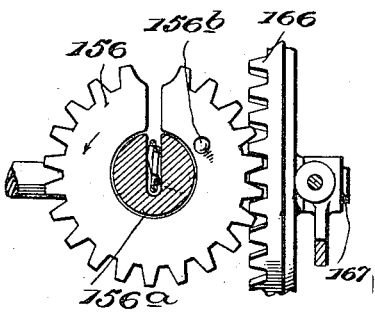
Witnesses
Inventor
O. M. Bryan.
By
Attorneys

UNITED STATES PATENT OFFICE.

OSCAR M. BRYAN, OF CHANUTE, KANSAS.

BALING-MACHINE.

1,017,202. Specification of Letters Patent. Patented Feb. 13, 1912.

Application filed March 21, 1911. Serial No. 615,982.

*To all whom it may concern:*

Be it known that I, OSCAR M. BRYAN, citizen of the United States, residing at Chanute, in the county of Neosho and State of Kansas, have invented certain new and useful Improvements in Baling-Machines, of which the following is a specification.

This invention comprehends certain new and useful improvements in automatic machines for baling hay, the invention embodying means for automatically carrying the hay into the machine, for packing it down into a baling chamber, for compressing it in said chamber, for encircling the bale with wire hoops, and for automatically carrying the bale, after completion, out of the baling chamber so as to permit it to be deposited to one side of the machine out of the way of the ground wheels, the different mechanisms being so timed that the baling operation will be practically a continuous one.

The machine is intended to travel over the fields after the hay has been mown, and is designed to be incorporated or embodied with a rake and an elevator or conveyer to carry the hay into the rear end of the machine for engagement by a carriage that is arranged to move a predetermined quantity of hay forwardly in the machine over the baling chamber, into which it is then packed by vertically movable packing forks; but as the rake and elevator are classified as different inventions from the rest of the mechanism, they are not disclosed in the present application.

The invention has for its primary object an automatic hay baling machine embodying an improved construction and arrangement of carriage and actuating mechanism therefor, arranged to receive a quantity of hay that is fed up to the rear end of the machine by the elevating mechanism, and to carry the hay forwardly to a space in the framework above the baling chamber, said mechanism including doors and improved tripping devices therefor, the doors being designed to fold inwardly at the rear of the load of hay so as to constitute tuckers.

The invention has for a further object, a machine of this character embodying improved actuating mechanism for the packing forks that are designed to pack the hay down into the baling chamber after it has been brought to a point above the latter by the carriage above mentioned.

The invention also has for its object an improved construction of baling chamber embodying doors for the top of the chamber. These doors open when the beater or plunger arrives at the far end of the doors, so that the next feed of hay will come in over the plunger and the packing forks will begin to move down somewhat before the rebound of the plunger, it being understood that the plunger travels some little distance, say five or six inches, forward after the doors have been opened. This chamber also embodies improved locking devices for the doors, and improved latch releasing devices and door opening devices that are successively brought into operation, as will be hereinafter more specifically described.

A further object of the invention is an improved construction and arrangement of beater or plunger and actuating device therefor, which will impart considerable power to the plunger in the forward movement thereof and permit the same to have a quick rebound, the plunger, in the preferred embodiment of the invention, being also designed to act as the specific means for releasing the latches that hold the doors closed at the top of the baling chamber while the hay is being compressed, and the plunger embodying an improved front end construction whereby all liability of the plunger sticking in its return movement is avoided.

The invention also has for an object an improved construction of baling chamber front end designed to retain the hay as against the forward pressure of the plunger, and improved means whereby the retaining device, part of which forms the front end or door of the baling chamber, will be quickly and automatically moved to an open or inoperative position as soon as the plunger has completed its forward movement to produce the required amount of compression in the bale.

A further object of the invention is improved hoop-applying devices that are automatically operated to carry the bale hoops in front of a bale as it is being formed, and finally swing the hoops around the rear end of the completed bale so as to hold the latter in compressed condition.

A further object of the invention is hoop applying mechanism which is automatically brought into operation by the plunger or beater on its return movement and which is described, I shall not describe it specifically, except so far as is necessary in connection with some details of construction. It is supported upon front and rear ground or traveling wheels, the latter being relatively large, and designated by the reference numeral 1. These ground wheels, which are the main driving wheels of the machine, are both mounted on a transversely extending axle or shaft 2 (Fig. 15, Sheet 8), the wheels being loosely mounted on the spindle of said shaft and operatively engaging the shaft only in the forward movement of the machine, by pawls 3 engaging ratchets 4. This shaft 2 constitutes the main drive shaft for all of the mechanisms involved herein and carries near its ends perpendicularly or radially disposed sweeps, preferably rigidly connected thereto, each of said sweeps embodying two oppositely extending arms 5, each of which preferably carries a roller 6.

*The load delivering carriage and its actuating mechanism.*—As the hay is carried up to the rear end of the machine and in between the main rear ground wheels 1, it is intended to be caught and grasped by hooks 7 that form part of a carriage 8, to the sides of which are journaled traveling wheels 9 mounted in horizontally disposed longitudinally extending guide channels 10, (see Figs. 1 to 4, inclusive, Sheets 1, 2 and 3). The carriage 8 operates above a horizontally disposed platform 11, the forward end of which terminates directly above the baling chamber hereinafter specified, and as the carriage is moved forwardly, the hay is dragged forwardly thereby. When the carriage is at the rear end of its movement, laterally swinging tucking doors 12 are in their wide open position back against the sides of the run-way of which the platform 11 forms a bottom, and as the carriage is moved forwardly, carrying the hay with it, spring lugs 13 that project downwardly from the carriage merely pass over rods 14 which project out from the hinged ends of the doors 12; but in the return or rearward movement of the carriage 8, these spring lugs 13 engage the rods 14 so as to swing the doors inwardly and forwardly to their relatively closed positions illustrated in Fig. 5, whereby the doors will serve as tuckers to tuck the hay inwardly and forwardly from the sides of the run-way. In this return movement of the carriage 8, retaining arms 15, that have been held by frictional spring hinges 16 against any swinging movement in the forward movement of the carriage, will ride over the top of the load of hay, as best illustrated in Fig. 3 and will finally drop down behind the load when the carriage has been returned to its initial rearward position. These movements are imparted to the carriage 8 by means of the sweep arms 5 hereinbefore mentioned and shown in detail in Fig. 15, (Sheet 8) the forward movement of the carriage being effected by the engagement of one of said arms 5 with outwardly and downwardly extending bars 17 which are secured to the carriage 8, as best illustrated in Figs. 1 and 4. The rearward movement of the carriage is effected by the next succeeding sweep arm in the continued rotation of the drive shaft 2, said last named sweep arm engaging a lever 18 fulcrumed at 19 and connected at its upper end to a longitudinally movable bar 20 to the rear end of which a friction disk 21 is journaled, whereby as the lever 18 is rocked by being struck with said arm 5, the bar 21 will be pulled forwardly and the disk 21 will be caused to engage the periphery of the wheel 1, effecting the rotation of the disk in a direction to wind up on a drum 22 (Sheet 7, Fig. 13) a cable 23 which is secured to the arm 17. It is, of course, to be understood that these parts are duplicated on the opposite sides of the machine, as will be seen by reference to Figs. 4, 5, 6, 13 and 15, but are described singly, for the sake of clearness. The same will hold true of other parts of the mechanism to be hereinafter specified, in order that, wherever convenient, only one side of the machine need be considered. It is also to be understood that an appreciable interval will elapse between the forward and rearward movements of the carriage 8, the carriage being held stationary at the forward limit of its movement, while the packing forks, now to be described, are operated to pack down into the baling chamber the hay that has been brought up to the same by the carriage.

*Packing forks and their operating means.*— The forks themselves, designated 24, may be of any desired construction or type and are carried on the relatively free ends of supporting arms 25 that are two in number in the present instance arranged in laterally spaced parallel relation to each other extending longitudinally of the machine and pivoted at their forward ends on standards 26 to rock about horizontal axes (see Figs. 1 and 13—Sheet 7). Intermediate of their ends, the supporting arms 25 are connected to depending links 27, and said links are in turn connected at their lower ends to cranks 28 on relatively short transverse shafts 29. These shafts are supported by pivoted standards 30 and are provided with friction disks 31, the shafts being operatively connected to the bars 20 hereinbefore referred to in connection with the carriage operating mechanism, whereby as the sweep arms 5 revolve, there will come a time when they will strike levers 32 fulcrumed intermediate of their ends at 33 and connected at their upper ends to the bars 20, and the consequent movement of said levers 32 will move the bars 20 in a direction to carry the disks 21 vided at its front end with a forwardly projecting bottom flange 60 and vertical side flanges 61 within which is a scraping blade 62, said blade being hinged at its lower edge, at 63 and standing in a substantially upright position so as to form part of the face of the plunger, as the latter moves forwardly. In the return movement of the plunger, the blade 62 yields slightly, as indicated by dotted lines in Fig. 7, (Sheet 4), so as to prevent any of the hay from catching in between the top of the plunger and the adjoining wall of the chamber.

The plunger operating mechanism embodies a relatively long pitman 64, (see Sheet 6) which is pivotally connected to the plunger near the front end and midway of the top and bottom of the latter by means of a transversely extending rod 65, the pitman extending downwardly and rearwardly, as shown, and being pivotally connected at its rear lower end to link bars 66 which are pivoted in the framework at their upper ends at 67, converging downwardly, as best seen in Fig. 11, and braced by a cross rod 68. Links 69 are pivotally connected at their rear ends to the same pin or pivot bolt 70 which connects the link bars 66 with the pitman 64, the opposite ends of said link 69 having received between them and being pivotally connected to a laterally projecting lug 71 that is formed on one end of a slotted link 72. A clevis or shackle 73 carries a roller 74 mounted for movement in the slot of the link 72, said shackle being secured to the lower end of a cable 75 which may be formed of strands or layers of steel wire or bands, as clearly illustrated on Sheet 6. The upper end of the cable 75 is connected to a cross bar 76 carried by a segment drum 77, said drum being freely swung upon the driving axle or shaft 2. Arms 78 are rigidly connected to the shaft 2 and project in opposite directions therefrom, said arms being mounted within the drum 77 and being designed, in the rotation of the shaft, to engage the cross bar 79 which is secured to an arched frame 80 pivotally connected to the drum and within the same and maintained in a definite position therein by a spring brace 81.

As the shaft 2 rotates, one of the arms 78 will engage the cross bar 79 of the drum 77, the drum and shaft then turning together until the cross bar 79 is stripped from the arm by engaging a stationary stud 82 secured to some convenient portion of the frame-work, whereupon the drum will be permitted to drop back to its original position. In this movement of the drum with the shaft 2, it is clear that the cable 75 will be wound upon the segmental periphery of the drum, an upward pull being thus exerted upon the cable, and the latter transmitting such pull to the pitman 64 which will be forced with considerable power forward as it is swung upwardly and thus effect the forward movement of the plunger. As soon as the drum has been released, the plunger will quickly rebound. Preferably, a spring 83 is secured to the pitman 64 and extends along the upper edge thereof, said spring having a curved end which extends down between the links 69, as shown, the spring constituting a yielding seat for the link 72 to ride on, and assisting in throwing the link back to position for the next forward stroke of the plunger. Manifestly, the link bars 66 of the pitman 64 are forced to move very rapidly in their initial forward and upward movement. This action, in connection with the spring in the cable 75 tends to throw the slotted link 72 back and down, and the roller 73 which rides in the slot of the links 72 will fall down, taking up quite a little of the stroke, which brings the plunger forward with increased power by having benefit of all, or nearly all the force of the plunger actuating mechanism. By the construction and arrangement of parts shown and described, it is clear that the spring cable 75 will, owing to its connection with the link bar 66 and pitman 64, bring the plunger pitman up and forward into the baler in a straight line.

*The front door of the baling chamber and its operating means.* (Sheets 1 and 7.)— The front wall of the baling chamber is formed by a door 84 which is swung from its upper edge, as at 85, and which is pivotally connected on its rear face half way between such edge and the opposite edge to one section 86 of a jointed brace plate 87. The rear edge of the section 86 of said brace plate is pivotally connected to a complemental section 88 between the front and rear edges of the latter, the parts being so arranged that when the rear edge of the section 88 overlaps and engages the section 86, with the two sections in a horizontal position at right angles to the door 84, the line of thrust against the rear face of the door 84 will be substantially coincident with the center of the plunger 51, and hence so long as the parts are in this position, the door will be prevented from opening, it being understood that the forward edge of the section 88 is pivotally connected to some portion of the framework, as at 89. After the bale has been completed, it is necessary for the door 84 to be released, so that the bale may be pushed forwardly from the baling chamber, and to accomplish the opening of the door 84, the lap joint of the sections 88 and 86 is broken by means of link rods 90 that are pivotally connected at their lower ends to the rear free edge of the section 88 and that are preferably adjustably connected at their upper ends to bell cranks 91, pivoted at 92. The upwardly project-mounted on a countershaft 123. The shaft 123 carries a sprocket wheel 124 around which a drive chain 125 extends, said chain also extending around a sprocket wheel (not shown) on the main driving shaft or axle 2. It will thus be understood that as the machine is drawn forwardly, an anti-clockwise movement will be imparted to the countershaft 123 and a clockwise movement will be thence imparted to the shaft 118 and the reels 117 carried thereby. As these reels are, specifically considered, exactly alike, a description and illustration of one will suffice for both. The reel 117, as best illustrated on Sheet 11, comprises, in the present instance, a rimless structure embodying eight radially extending spokes or arms, each of which is provided near its outer end with lugs 126 designed to directly support the wire that is being formed into a loop or hoop. As it is necessary to distinguish three of these arms from the others, I have designated such arms A, B and C. A segmental web or plate 127 is secured to the arms A and B and fills the space between the same, said plate carrying a looper 128 which comprises (Fig. 23) a spindle 129 journaled in the plate 127, a notched and angular looping finger 130 being secured to the spindle near the outer end thereof. The spindle 129 has a wire guiding finger 131 designed to direct the wire toward and underneath the spindle 129. The spindle is provided at its inner end with a spur pinion 132.

Mounted freely upon the shaft 118 on the inner side of the reel 117 is the arm 115 hereinbefore mentioned, said arm being mounted to rock or oscillate and carrying a bar 133 which is pivotally connected thereto, as at 134, to swing in a plane parallel to the plane of movement of the arm. The arm 115 carries a wire clutch 134ª, and the bar 133 also carries a clutch, designated 135. The wire 136 passes from the spools through the spring closed clutches 134 and 135. As the reel is rotated, the arm A, which is notched at its outer end, as at 137, and which is the notch longer than the other arms, is adapted to engage a swinging link 138, carried by the outer end of the arm 115, whereby the continued movement of the reel will cause the arm 133 to swing toward the right as the reel is viewed on Sheet 11, carrying the clutches with it and consequently the wire also. The arm 115 is provided with a lever 139 pivoted at 140, the lower arm of said lever being designed to engage with the adjoining edge of the pivoted bar 133. In the rotation of the reel and swinging movement of the arm 115, the upper end of this lever 139 will finally engage and trip upon a pin or bumper 141 projecting from the front face of the board 119, while at the same time the releasing lever 142 of the clutch 134 engages a similar pin 143. The engagement of the lever 142 with the pin 143 will release the hold of the clutch 134 upon the wire, and the engagement of the lever 139 with the pin 141 will cause said lever 139 to impart a swift swing to the bar 133, whereupon the clutch 135 will overtake the clutch 134 and carry the end of the wire forwardly over the guide 131 and under the spindle 129. Immediately thereafter, the rotation of the reel will bring the pinion 132 in engagement with the teeth of a relatively short rack 144 that is secured to the board 119, and the spindle 129 will be turned sufficiently to cause the looping finger 130 to form a two-thirds loop of the wire around the spindle, as indicated in Fig. 23. The end of the wire will thus be caught, the looping finger being held in this position by a spring detent 145, and as the reel continues to revolve, the lever 139 will finally contact with a pin or bumper 146, the lever being thereby tripped and releasing the bar 133, which flies back with open clutch. As the reel continues to move around, the link 138 will engage and be tripped by the pin or bumper 147, the arm 115 being thereby released, whereby said arm with its bar 133 will come back with open clutches to its original starting position illustrated on Sheet 11. In the further movement of the reel, it is evident that the wire will be drawn through the clutches and formed into a complete circle around the series of lugs 126, the looper 128 finally arriving at a point where a complete circle has been formed and the end of the wire coming from the reel, stretching from the clutches again to the looper will fall into the notch 148 of a cutter bar 149. At this point in the movement, the pivoted cutter 150, carried by the cutter bar 149 and spring held in an inoperative position, will be rocked to cut off the wire by means of a link rod 151, one end of which is pivotally connected to a crank 152 (see Fig. 25) on a stub shaft 153 mounted in the plate 127, the shaft 153 also carrying a toothed segment 154 which meshes with a rack 155 secured to the board 119. The wire will thus be cut, and it is then only necessary to twist the looped ends and to cast the completed hoop laterally from the reel. These operations are accomplished by the following means and in the following manner: The twister, designated 156, is in the form of a spur pinion mounted on a stationary hub 156ª (see Fig. 33) and provided with a slot designed to receive the looped ends of the wire, and said pinion is journaled on the projecting angular side 157 of a frame or bracket 158 mounted for a slight vertical movement on the outer side of the plate 127. The frame 127 is normally in lowered position, but in the rotation of the reel 117, when the looper 128 is at the point illustrated on Sheet 11 and the hoops move in between guide bars 192 so as to be properly guided to the openings 108ª in the side of the baler, through which they pass into the baling chamber.

As best illustrated in Fig. 30, the frame 158 has a link 193 connected to it, said link being pivotally connected to a jointed arm 194 which is fulcrumed on a stationary bracket 195. The upper end of this arm bends inwardly and is forked, as indicated at 196. As the frame 158 moves upwardly, the joint of the arm 194 is broken, as is manifest, whereby the upper forked end thereof will be moved inwardly so that the forked end 196 will engage the wire and positively move it down into the slot of the twister pinion, so that the twister pin 156ᵇ on the side of the twister pinion will come in contact with the wire and twist the wire around the loop. It is to be understood that the loop itself does not twist but lies in the slotted hub 156ª that carries the twister pinion.

As best illustrated in Fig. 32 (Sheet 14), it will be seen that the cutter bar 149 carries a pin wheel 197 embodying four arms that are adapted to sweep past the cutter recess 148 and a receiving recess 148ª formed in the cutter bar in stepped relation to the cutter recess 148. The cutter 150 is provided with an outwardly directed finger 150ª that is designed to strike the pins 197, which in the present instance are four in number, and which project perpendicularly as shown. Now as the rear end of the cutter 150 is moved to cut the wire, the finger 150ª will pass the adjacent pin 197, but will hit it, and as the finger 150ª comes back it will hit it again, causing the pin 197 just under the wire to raise the end of the wire upon the receiving recess or saddle 148ª, where it will stay and be pushed forward at the proper time to form another loop, thus leaving the cutter recess 148 empty to receive the next wire to be cut.

It is of course to be understood that my invention is not limited to any means for drawing or propelling the machine over the fields. For instance, as illustrated in Figs. 1 and 31 (Sheets 1 and 14), the machine may carry an internal combustion or other motor 198, operatively connected by drive chains 199 to sprocket wheels 200 on a countershaft 201 journaled in standards 202. This shaft 201 carries spur pinions 203 designed to mesh with gear teeth 204 formed in the inner sides of the rims of the wheels 1, so as to propel the machine forwardly. Or, if desired, the machine may be provided with a tongue, or, as illustrated in Fig. 31, with a hitch or whiffletree 205 connected to the main axle by draft rods 206.

As the operations of the different mechanisms together combining to produce my improved automatic baling machine have been described serially in connection with the description of the construction and arrangement of the parts, the practical operation of the machine will therefore be understood and no other detailed description of the operation is deemed necessary.

While the foregoing description and accompanying drawings disclose what I believe to be the preferred embodiment of my invention, it is to be understood that the invention is not limited thereto, but that various changes may be made in the construction, arrangement and proportions of the parts without departing from the scope of the invention as defined by the appended claims.

Having thus described the invention, what is claimed as new is:—

1. A baling machine, embodying a baling chamber, a reciprocating carriage mounted above the baling chamber, the machine being provided with a runway the rear end of which is designed to receive the hay into the machine and the front end of which communicates with the baling chamber, doors mounted in said runway, means for drawing the carriage forwardly to carry the hay past the doors with the latter in open position, and means operative by the return movement of the carriage for closing said doors whereby to tuck the hay inwardly from the walls of the runway.

2. A baling machine, embodying a baling chamber, a runway leading from the rear of the machine to the baling chamber, a carriage mounted to reciprocate above the runway and adapted to carry the hay toward the baling chamber, laterally movable doors mounted in the runway and provided with fingers, the carriage being provided with spring lugs arranged to engage said fingers in the return movement of the carriage whereby to close the doors inwardly and forwardly to tuck the hay, and means for reciprocating said carriage.

3. A baling machine, embodying a baling chamber and a runway leading to said baling chamber, a carriage mounted to reciprocate above the runway and arranged to carry the hay from the receiving end of the runway toward the baling chamber, depending arms carried by said carriage, a drive shaft, sweep arms carried by said drive shaft and arranged to strike said depending arms to move the carriage forwardly in the runway, and means for moving said carriage rearwardly.

4. A baling machine, embodying a baling chamber, a runway leading to the baling chamber, a carriage mounted to reciprocate above the runway and adapted to carry the hay from the receiving end of the machine toward the baling chamber, means for moving said carriage toward the baling chaming chamber, doors adapted to fold down to constitute the top of said chamber, means for closing the doors, means for locking the doors in closed position, means for releasing the locking means, said locking means including a jointed arm provided at the joint with a roller, and a cam adapted to strike said roller, a plunger movable in the baling chamber and carrying said cam, and means for opening the doors.

14. In a baling machine, a plunger provided at its front end with side flanges, and a scraping plate pivotally mounted at its lower edge in between said side flanges and freely movable away from the front face of the plunger.

15. In a baling machine, a plunger provided at its front end with side flanges, and a scraping plate pivotally mounted at its lower edge in between said side flanges and freely movable away from the front face of the plunger, the upper edge of the plate projecting slightly above the top of the plunger.

16. A baling machine, embodying a plunger, a pitman connected thereto, a drive shaft, a drum loosely mounted on the drive shaft, a cable connected to the drum and with the pitman, an arm carried by the drive shaft, means for effecting an engagement between the arm and the drum whereby to turn the latter in a direction to wind up on the cable and drive the plunger forwardly, and means for releasing the drum from said arm.

17. A baling machine, embodying a plunger, a pitman connected thereto, a cable operatively connected to the pitman, a drum connected to the cable, a drive shaft on which the drum is loosely mounted, an arm secured to the shaft and mounted within the drum, an arched frame secured to the drum, a cross bar connected to said frame and adapted to be engaged by said arm whereby to move the drum with the shaft, and means for striking the frame and its cross bar from off the arm.

18. A baling machine, embodying a plunger, a pitman operatively connected thereto, link bars connected to the rear end of the pitman, links connected to the pitman, a slotted link connected to the last named links, a clevis movable within the slot of said slotted link, a cable connected to said clevis, and means for winding up the cable and subsequently releasing the same, as and for the purpose specified.

19. A baling machine, embodying a plunger, a pitman connected thereto, a slotted link operatively connected to the pitman, a clevis mounted to move in the slot of said link, a cable connected to said clevis, means for winding on the cable and subsequently releasing the same, and a spring connected to the pitman and engaging the link, for the purpose specified.

20. A baling machine, embodying a plunger, a pitman connected thereto, a slotted link, laterally spaced links connected to the pitman, the slotted link being formed with a laterally offset lug by which it is pivotally connected in between the spaced links, a clevis mounted to move in the slot of the slotted link, a cable connected to said clevis, means for winding on the cable and subsequently releasing the same, and a spring connected to the pitman and having a curved rear end extending upwardly between the spaced links into egagement with the rear end of the slotted link.

21. A baling machine, embodying a plunger, a pitman connected to said plunger, a cable operatively connected at one end with the pitman, a drive shaft, a segmental drum loosely mounted on the drive shaft, an arm connected to said shaft and mounted within the drum, an arched frame pivotally mounted in the drum and provided with a cross bar adapted for engagement by said arm, a spring connected to the drum and to the frame to yieldingly hold the same in position, and means for engaging the frame to move it against the tension of its spring whereby to release the cross bar from the arm.

22. A baling machine, embodying a baling chamber, a front door therefor arranged to swing upwardly and forwardly, a jointed brace constructed in pivotally connected sections one of which is arranged to overlap the other with the sections in operative position whereby to resist pressure imposed upon the door in a direction to swing it open, and means for breaking the joint between said sections whereby to permit the door to open.

23. A baling machine, embodying a baling chamber, a front door therefor arranged to swing upwardly and forwardly to open position, a jointed brace adapted to resist said movement, and means for breaking the joint, the brace being constructed in sections arranged to overlap, a link connected to one of said sections, a bell crank connected to said link, a shaft provided with a crank arm and means for turning said shaft, and a connection between the bell crank and said crank arm.

24. A baling machine, embodying a baling chamber, a front door therefor arranged to swing forwardly and upwardly to open position, a sectional jointed brace arranged to resist the opening movement of the door, means for breaking the joint of said brace, said means including a shaft, a wheel mounted on said shaft, a bar operatively connected to said shaft, a drive shaft, a lever connected to said bar, and a sweep arm car-